UNITED STATES PATENT OFFICE.

WILLIAM G. KRANZ, OF SHARON, PENNSYLVANIA, ASSIGNOR TO THE NATIONAL MALLEABLE CASTINGS COMPANY, OF CLEVELAND, OHIO, A CORPORATION OF OHIO.

METHOD OF PREPARING IRON FOR CASTINGS.

1,206,861. Specification of Letters Patent. Patented Dec. 5, 1916.

No Drawing. Application filed November 17, 1915. Serial No. 61,884.

*To all whom it may concern:*

Be it known that I, WILLIAM G. KRANZ, a citizen of the United States, residing at Sharon, Mercer county, Pennsylvania, have invented a new and useful Method of Preparing Iron for Castings, of which the following is a specification.

My invention relates to the treatment of iron intended to be made into castings; and is designed to overcome the difficulties resulting from the presence of relatively high carbon and also in some cases of relatively high manganese and silicon, but particularly of carbon, in the iron.

In carrying out my invention, pig iron or scrap, or both, high in carbon, and which may contain appreciable percentages of manganese and silicon, are melted in any suitable furnace, such as a cupola, open hearth, or air furnace. A portion of the melted charge depending on the amount of carbon and other impurities to be removed is then tapped out of the furnace and transferred to a Bessemer converter, in which the carbon, manganese and silicon are wholly or partially blown out. The treated metal, and the remainder of the charge direct from the furnace, are then poured into a ladle or other container with the result that the percentage of carbon (as well as the percentage of the manganese and silicon) in the complete charge is reduced to within desired limits, and may then be cast. If a further refinement is desired the charge may be transferred to an electric or other suitable refining furnace, in which the refinement of the metal is completed.

It may also be desirable to tap the metal in the first instance from a blast furnace, in which event a proper proportion of the metal is first introduced into and treated in a bessemer and the carbon and other substances reduced. The treated metal is then mingled with the remainder of the charge from the blast furnace either to be cast or to be further treated in a refining furnace.

I have found that with a charge of iron containing 3.25 per cent. of carbon very satisfactory results can be obtained by taking one fifth of the charge, introducing it into a bessemer and reducing the carbon to .50 per cent. or less by treatment therein, so that when the treated metal is mingled with the remainder of the charge the percentage of carbon in the whole is approximately 2.70 per cent. After further treatment in an electric furnace the metal thus refined is extremely well adapted for malleable castings, and can be produced at a very much lower cost and in much less time than is the case when the reduction of the carbon is effected in either the melting furnace or in the electric furnace. If it is desired to produce gray iron castings, suitable additions such as manganese or silicon may be made in the vessel to which it has been transferred, and the charge may then be cast.

The advantages of my invention will be apparent to those skilled in the making of iron castings, since the troubles arising from high percentages of carbon and in some instances from high percentages of manganese and silicon, are practically eliminated, and iron containing excesses of such materials is rendered commercially available for malleableizing and other purposes at a low cost and with a considerable saving in the time required for its conversion into castings. By the use of my invention it will be seen that the carbon and other substances may be reduced and equalized in any proportions depending on the character of the iron which it is desired to produce. It is, however, not usually desirable to reduce the carbon below 1.50 per cent.; and while for certain purposes the treated metal may contain any per cent. below the carbon content of the untreated metal, in most instances it is desirable to reduce the carbon to below 3 per cent.

The terms and expressions which I have employed are used as terms of description and not of limitation, and I have no intention, in the use of such terms and expressions, of excluding any equivalents of the features shown and described, or portions thereof, but recognize that various modifications in the method as described and in the apparatus as used are possible within the scope of the invention claimed.

What I claim is:

1. That improvement in the art of preparing iron for castings, which consists in treating iron high in carbon, manganese and silicon, by taking a charge of iron from a furnace, transferring a portion of the charge to a Bessemer converter and treating it therein for the reduction of the carbon, manganese and silicon, and then combining the molten metal thus treated with the remainder of the molten charge in another vessel, whereby the carbon, manganese and silicon in the complete charge are reduced and equalized.

2. That improvement in the treatment of iron which consists in taking molten high carbon iron and treating it in a Bessemer converter to reduce the carbon, and then transferring it to and combining it while molten in another vessel with a larger portion of molten high carbon iron, whereby the percentage of carbon in the complete charge is reduced and equalized.

3. That improvement in the treatment of iron which consists in treating iron high in carbon, by taking a portion of such iron in a molten state and treating it in a Bessemer converter to reduce the carbon, and then transferring the treated metal and combining it while molten with a larger portion of molten iron also high in carbon, and treating it in an electric furnace, whereby the percentage of carbon in the complete charge is reduced and equalized.

4. The process of preparing iron for castings which consists in melting iron in a melting furnace, tapping a portion of such molten iron from said furnace and substantially removing its carbon in a Bessemer converter, adding said molten decarbonized metal to a larger portion of the molten iron from said melting furnace whereby the carbon in the combined charge is reduced and equalized, but remains above 1.50 of carbon, and finally treating the combined charge in a refining furnace without further substantial reduction of carbon.

WILLIAM G. KRANZ.